Oct. 3, 1950 J. K. HENDERSON ET AL 2,524,664
LOAD HANDLING MECHANISM FOR WHEELED VEHICLES
Filed July 26, 1947 2 Sheets-Sheet 1
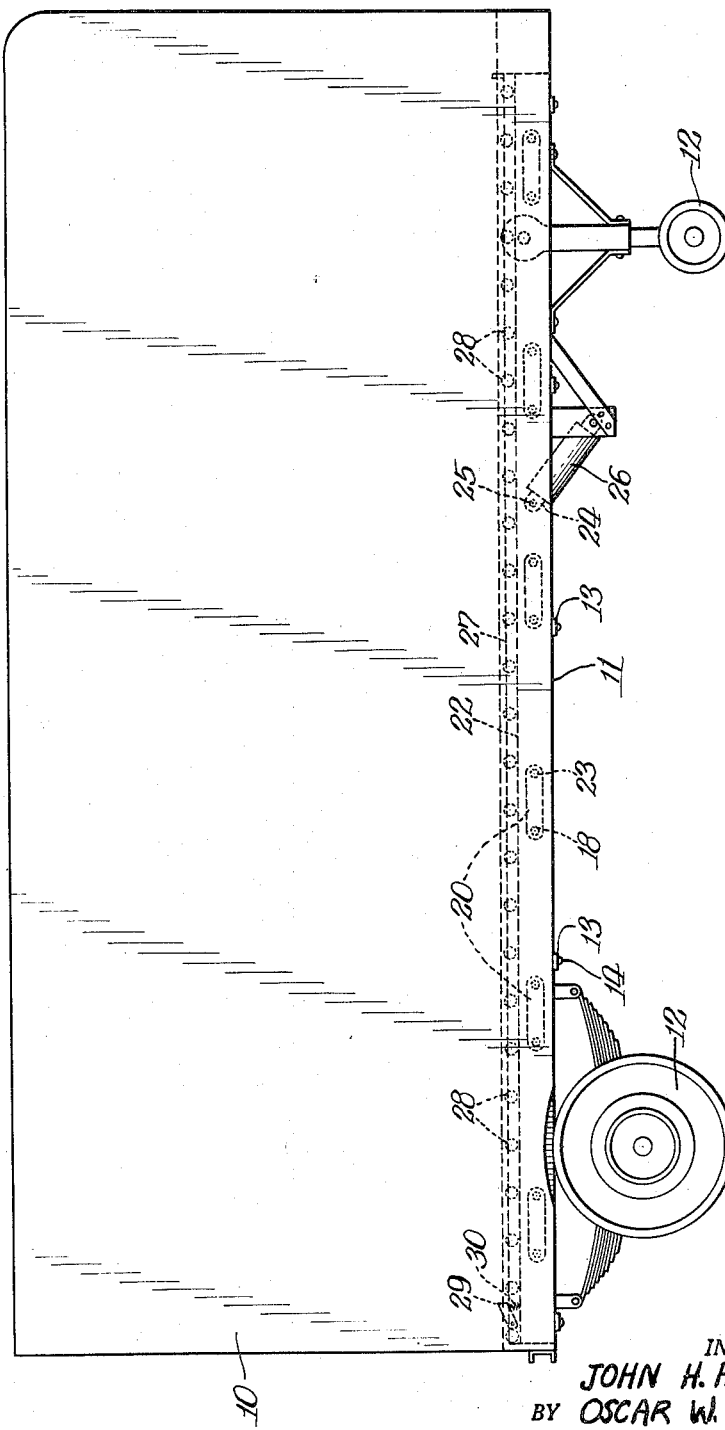
INVENTORS.
JOHN H. HENDERSON
BY OSCAR W. ANDERSON

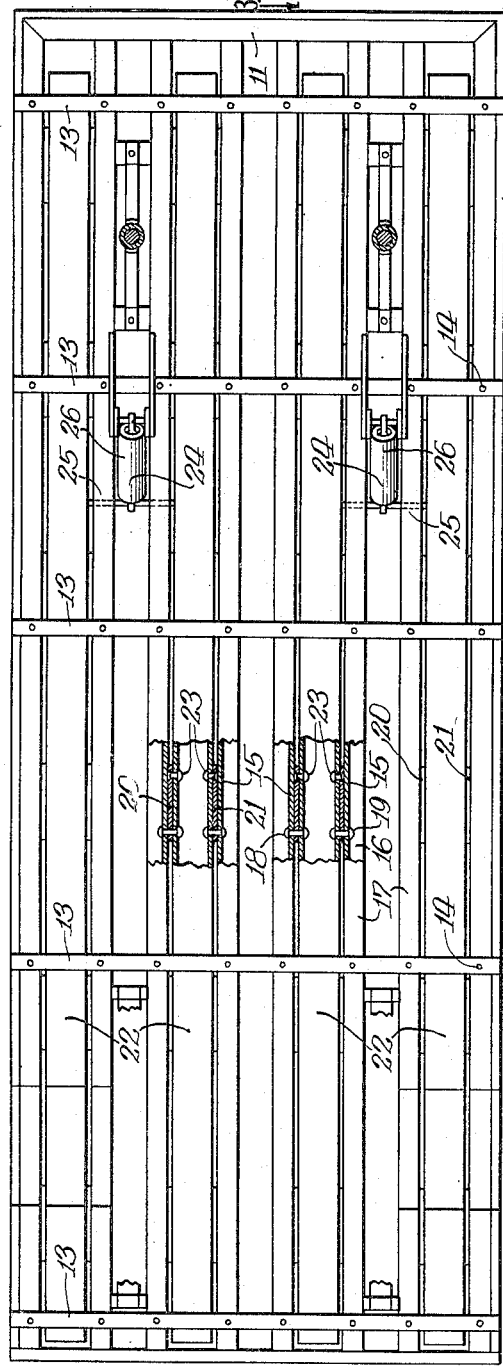
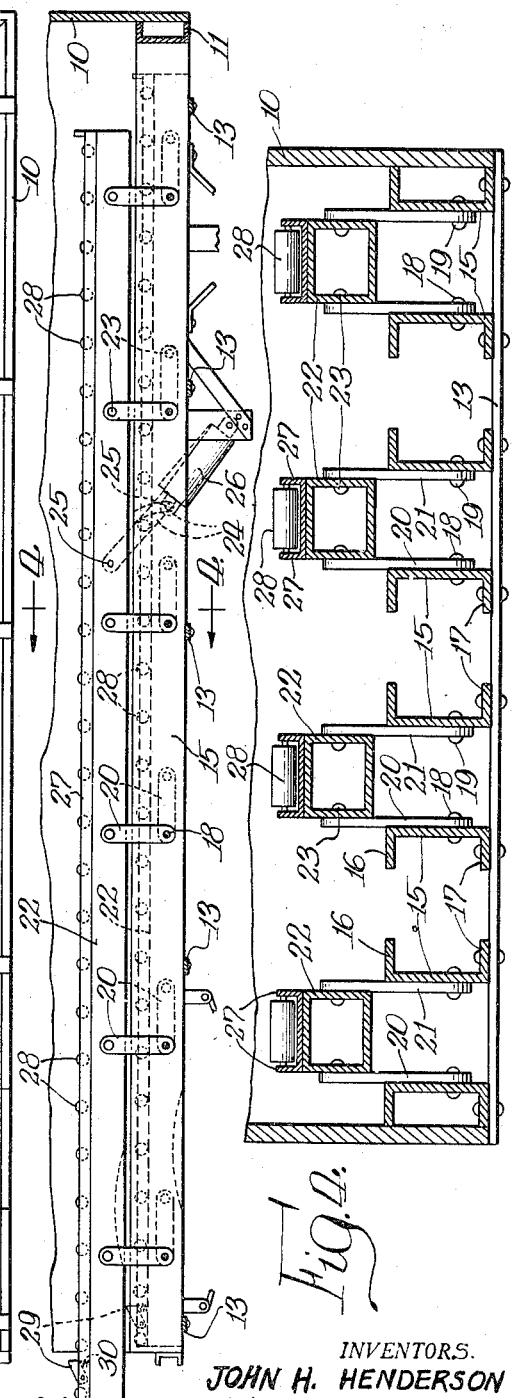

Patented Oct. 3, 1950

2,524,664

UNITED STATES PATENT OFFICE 2,524,664

LOAD HANDLING MECHANISM FOR WHEELED VEHICLES

John K. Henderson, Villa Park, and Oscar W. Anderson, Elmhurst, Ill.

Application July 26, 1947, Serial No. 763,866

2 Claims. (Cl. 214—84)

This invention relates to improvements in vehicles for the transportation of goods and materials, whether in bags, packages or merely loose, and has for its object the provision of such a vehicle having a load supporting body or floor of such construction and design as to facilitate handling of load units into or out of the vehicle on the pick-up forks of a standard industrial lift truck without the use of pallets, skids or the like.

In the loading of various materials with the aid of an industrial lift truck, it is customary to employ pallets or skids located below the load unit, and provided with rails or feet which provide a space between the load unit and the floor or supporting surface for the entrance of the fork members of the lift truck in connection with loading or unloading operations. While the use of pallets has been generally adopted as the most satisfactory method of loading and unloading material in freight cars, trucks and other shipping mediums, a substantial expenditure of time, labor and operating costs in the handling and maintenance of pallet equipment has long been recognized as an obstacle to further economies and efficiency in material handling operations.

With a view to reducing handling costs by eliminating pallets, the present invention resides in the provision of a vehicle having a floor or load supporting deck which includes a series of spaced parallel sections mounted for vertical movement relative to intermediately located, fixed or stationary floor sections, said movable sections, when in lowered position, are substantially level with the upper surface of the fixed floor sections and when in raised position provide spaces under the load carried thereby for receiving the fork members of a fork lifting truck.

It is a further object of this invention to provide a construction, as above described, having means operative to obstruct accidental relative movement of the load in a predetermined direction lengthwise of said load supporting members.

A still further object of this invention is to provide a vehicle, as above described, having movable floor sections equipped with anti-friction means on their upper surfaces to facilitate movement of the load unit along the length of said floor sections.

The foregoing and other objects and advantages of the present invention will appear as the description proceeds, reference being made from time to time to the accompanying drawings forming part of the within disclosure, in which drawings:

Fig. 1 is a side elevational view of a truck trailer embodying the improvements forming the subject of this invention, showing the movable floor sections in lowered position.

Fig. 2 is a bottom plan view, with parts broken away to illustrate arrangement of parts in connection with the movable floor sections.

Fig. 3 is a fragmentary vertical sectional view taken on line 3—3 of Fig. 2, illustrating the movable floor sections in raised position, by means of full lines, and in lowered position, by means of dotted lines.

Fig. 4 is an enlarged fragmentary vertical section taken on line 4—4 of Fig. 3 showing relative position of parts when movable floor sections are in raised position.

Referring more particularly to the drawings, the numeral 10 designates a motor driven truck trailer body having a bottom framework 11 supported on wheels 12 in the usual manner. Cross-members 13 are arranged at spaced intervals lengthwise of the longest dimension of the framework 11, are secured at opposite ends to the latter, as at 14.

Supported by and secured to said cross members 13 and arranged in spaced parallel relation lengthwise of the frame 11 are a series of channel-iron elements, arranged in pairs so as to present upright side walls 15 and laterally outwardly projecting flanges 16 and 17, respectively, at the upper and lower limits of the upright walls. Thus the flanges at the upper limits of the upright walls of said channel members overhang the space between each cooperating pair of channel members, whereby the upper surface of the flanges 16 present fixed load supporting surfaces in a common horizontal plane. Mounted for vertical swinging movement adjacent the inwardly facing surfaces of the upright walls 15 of such cooperating pairs of channel members about pivots 18 and 19 are a series of pairs of arms 20 and 21 arranged at spaced intervals lengthwise of said channel members. A rail 22 positioned between and pivotally connected as at 23 to the outer swinging ends of the arms 20 and 21 is accordingly mounted for vertical movement under control of said arms 20 and 21 toward and away from a lowered position wherein the lower side of the rail 22 rests on the surfaces of the cross members 13 therebelow. The arms 20 and 21 are of uniform length whereby rising and falling movement of the rail 22 is substantially parallel to the plane of the upper surface of the flanges 16. Power for lifting the rails 22 is applied through rams 24 pivotally connected to the rails 22 as at 25 each of which is driven under pressure transmitted thereto by a cylinder 26 secured underneath the frame 10 and connected to the line of a conventional hydraulic device.

Each rail 22 has fastened to its upper surface an auxiliary member providing spaced upwardly extending walls 27 between which anti-friction rollers 28 are rotatably supported. The upper faces of the rollers 28 accordingly provide load engaging means to facilitate movement of load units lengthwise of the rails. The relative dimensions of the space between the upright walls 15 of each cooperating pair of channel members and the rail 22 and rollers 28, are such that the rollers are in non-protruding relation to the plane of the upper surface of the channel member flanges 16, when the rail 22 is in lowered position.

As shown in Fig. 3, the operation of lifting the rail 22 to a raised position is accompanied by a longitudinal shifting of the rail whereby a portion of its length overhangs the corresponding end of the frame 11 of the vehicle. A pivoted stop member 29, biased by a spring 30 into operative position, is carried by said overhanging portion of the rail 22 to provide an abutment engageable with the loaded article to prevent accidental sliding of the load in the direction of the outer end of the rails 22.

As shown in Fig. 2, a pair of rails 22 serving the area of the vehicle floor on one side of a line dividing the floor medially of its width is preferably operated independently of the rails 22 serving the area on the other side thereof. To this end, separate power lifting devices are used.

As shown in Fig. 4, the space provided between the rails 22 affords access to the bottom of a load unit engaged by the rollers 28 for the forks of a suitable fork lift truck without the use of special devices such as pallets or skids.

Various changes and modifications may be made without departing from the spirit of the present invention and all such changes are contemplated as may come within the scope of the claims.

What is claimed is:

1. In a wheeled vehicle having a load supporting floor consisting of spaced pairs of transversely spaced parallel upwardly opening channels extending lengthwise of said floor, a load lifting rail arranged in each of said channels, each rail being substantially of a length and height corresponding to the length and vertical dimension of its associated channel and being movably connected to the side walls of the channel associated therewith by links operable to move said rail from a position within said channel with the upper portion of the rail substantially coplanar with the upper surface of the load supporting floor to an elevated position in upwardly spaced relation to the upper limits of the load supporting floor, and vice versa.

2. In a wheeled vehicle as claimed in claim 1 wherein said rails are each provided with anti-friction means comprising rollers rotatably supported above said rails.

JOHN K. HENDERSON.
OSCAR W. ANDERSON.

REFERENCES CITED

The following references are of record in the file of this patent:

UNITED STATES PATENTS

| Number | Name | Date |
| --- | --- | --- |
| 559,552 | Turner | May 5, 1896 |
| 1,868,568 | Yrarrazaval | July 26, 1932 |
| 2,116,150 | Howie et al. | May 3, 1938 |
| 2,176,636 | Meacham | Oct. 17, 1939 |
| 2,354,337 | Smith | July 25, 1944 |

FOREIGN PATENTS

| Number | Country | Date |
| --- | --- | --- |
| 481,359 | Great Britain | Mar. 10, 1938 |